United States Patent
Hasegawa et al.

(10) Patent No.: US 11,027,418 B2
(45) Date of Patent: Jun. 8, 2021

(54) ROBOT AND WORKING METHOD BY THE ROBOT

(71) Applicant: KAWASAKI JUKOGYO KABUSHIKI KAISHA, Kobe (JP)

(72) Inventors: Shogo Hasegawa, Kakogawa (JP); Satoru Hibino, Kobe (JP); Hideshi Yamane, Kakogawa (JP); Hiroyuki Mizumoto, Kobe (JP); Kenji Bando, Nishinomiya (JP); Daichi Himekawa, Nishinomiya (JP); Junichi Matsuoka, Kobe (JP); Tatsuhiro Uto, Akashi (JP); Hiroki Kokushi, Kakogawa (JP); Soichi Tamada, Akashi (JP); Akihiro Haneda, Kakogawa (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 378 days.

(21) Appl. No.: 15/776,430

(22) PCT Filed: Nov. 11, 2016

(86) PCT No.: PCT/JP2016/083460
§ 371 (c)(1),
(2) Date: May 16, 2018

(87) PCT Pub. No.: WO2017/086240
PCT Pub. Date: May 26, 2017

(65) Prior Publication Data
US 2018/0326575 A1    Nov. 15, 2018

(30) Foreign Application Priority Data
Nov. 16, 2015    (JP) .............................. JP2015-223785

(51) Int. Cl.
*B25J 9/00* (2006.01)
*B25J 9/04* (2006.01)
*B25J 9/16* (2006.01)

(52) U.S. Cl.
CPC .......... *B25J 9/0087* (2013.01); *B25J 9/0093* (2013.01); *B25J 9/0096* (2013.01); *B25J 9/043* (2013.01); *B25J 9/162* (2013.01)

(58) Field of Classification Search
CPC ........ B25J 9/043; B25J 9/0087; B25J 9/0093; B25J 9/0096; B25J 9/162
See application file for complete search history.

(56) References Cited

U.S. PATENT DOCUMENTS 4,569,627 A * 2/1986 Simunovic ................. B25J 9/04
33/613
9,044,856 B2  6/2015 Nagasaka et al.
(Continued)

FOREIGN PATENT DOCUMENTS

EP    2363250 A2    9/2011
EP    2703129 A2    3/2014
(Continued)

*Primary Examiner* — Nicholas Kiswanto
(74) *Attorney, Agent, or Firm* — Oliff PLC

(57) ABSTRACT

A robot and a working method by the robot is capable of favorably carrying out a specific work without requiring a jig for fixing an object, such as a workpiece etc., a device for adjusting the posture of the object, etc. One example of the robot includes a first robotic arm having at a tip end a hand part according to a specific work to be performed to an object, and a second robotic arm having at a tip end a hand part according to an assisting work to assist the specific work. The first robotic arm is configured to perform the specific work to the object. The second robotic arm is configured to perform the assisting work to regulate a movement of the object in a given direction, when the first robotic arm performs the specific work.

2 Claims, 5 Drawing Sheets

(56) References Cited

U.S. PATENT DOCUMENTS

| | | | |
|---|---|---|---|
| 9,428,323 B2* | 8/2016 | Malavenda | B65B 5/06 |
| 9,926,138 B1* | 3/2018 | Brazeau | B65G 1/1376 |
| 10,022,867 B2* | 7/2018 | Saboo | G05D 1/0274 |
| 10,202,212 B2 | 2/2019 | Nagata et al. | |
| 10,329,042 B2* | 6/2019 | Nammoto | B65B 57/06 |
| 2009/0132088 A1 | 5/2009 | Taitler | |
| 2009/0249750 A1* | 10/2009 | Black | B65B 35/52 |
| | | | 53/443 |
| 2014/0041498 A1* | 2/2014 | Kuo | B26D 7/06 |
| | | | 83/152 |
| 2015/0127141 A1 | 5/2015 | Kawada et al. | |
| 2016/0039092 A1* | 2/2016 | Harada | B25J 9/1679 |
| | | | 700/193 |
| 2016/0059972 A1* | 3/2016 | Nagata | B65B 43/42 |
| | | | 53/446 |
| 2020/0101602 A1* | 4/2020 | Bando | B25J 9/1612 |

FOREIGN PATENT DOCUMENTS

| | | |
|---|---|---|
| EP | 2921266 A2 | 9/2015 |
| JP | S64-28120 A | 1/1989 |
| JP | H04-028621 A | 1/1992 |
| JP | H09-222913 A | 8/1997 |
| JP | 2004-244141 A | 9/2004 |
| JP | 2005-529809 A | 10/2005 |
| JP | 2008-302962 A | 12/2008 |
| JP | 2015-085479 A | 5/2015 |
| JP | 2015-186834 A | 10/2015 |
| JP | 6252597 B2 | 12/2017 |
| WO | 2014/181733 A1 | 11/2014 |

* cited by examiner

ROBOT AND WORKING METHOD BY THE ROBOT

TECHNICAL FIELD

The present disclosure relates to a robot and a working method by the robot.

BACKGROUND ART

Conventionally, at production plants of electric devices etc., robots are used to perform works. For example, Patent Document 1 discloses that a robot performs works, such as gripping an object, moving the gripped object, and combining a plurality of objects.

REFERENCE DOCUMENT OF CONVENTIONAL ART

Patent Document

[Patent Document 1] JP2015-186834A

DESCRIPTION OF THE DISCLOSURE

Problems to be Solved by the Disclosure

Meanwhile, when performing a given target work (specific work) to an object, such as a workpiece etc., a jig for fixing the object, a device for adjusting the posture of the object, etc. are needed according to the work.

The present disclosure is made in order to solve the problem as described above, and one purpose thereof is to provide a robot and a working method by the robot, which is capable of favorably carrying out a specific work, without requiring a jig for fixing an object, such as a workpiece etc., a device for adjusting the posture of the object, etc.

SUMMARY OF THE DISCLOSURE

In order to achieve the purpose, a robot according to one aspect of the present disclosure includes a first robotic arm having at a tip end a hand part according to a specific work to be performed to an object, and a second robotic arm having at a tip end a hand part according to an assisting work to assist the specific work. The first robotic arm is configured to perform the specific work to the object, and the second robotic arm is configured to perform the assisting work to regulate a movement of the object in a given direction, when the first robotic arm performs the specific work.

Further, in a working method by a robot according to another aspect, the robot including a first robotic arm having at a tip end a hand part according to a specific work to be performed to an object and a second robotic arm having at a tip end a hand part according to an assisting work to assist the specific work performs the specific work to the object by an operation of the first robotic arm, and performs the assisting work to regulate a movement of the object in a given direction by an operation of the second robotic arm, when the specific work is performed.

According to the robot and the working method by the robot described above, when the first robotic arm performs the specific work, by the second robotic arm performing the assisting work in which the movement of the object in the given direction is regulated, the specific work can favorably be carried out, without requiring a jig for fixing the object, a device for adjusting the posture of the object, etc.

Effect of the Disclosure

The present disclosure has the structure described above and has the effect that the specific work is favorably achieved, without requiring the jig for fixing the object, such as the workpiece etc., the device for adjusting the posture of the object, etc.

MODE FOR CARRYING OUT THE DISCLOSURE

Figure 1:
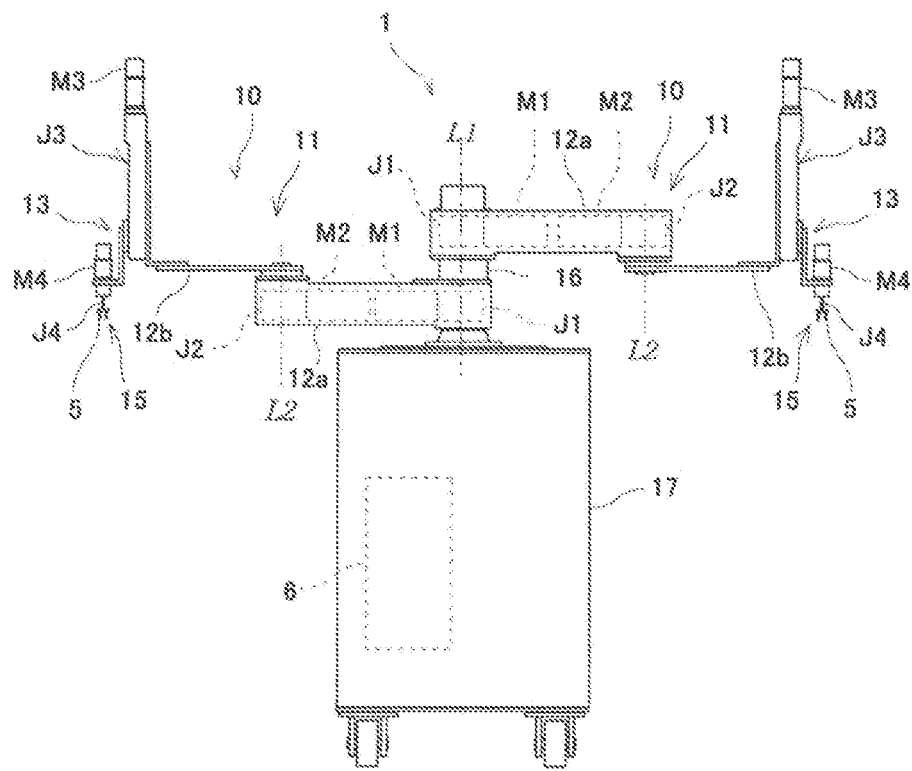
FIG. 1 is an outline front view illustrating an entire structure of one example of a robot according to one embodiment.

Hereinafter, a preferable embodiment is described with reference to the drawings. Note that, below, the same reference characters are given to the same or corresponding element throughout the drawings to omit redundant description. Moreover, in order to make them easy to understand, the drawings illustrate each component schematically and may not indicate exact shapes and scales.

EMBODIMENT

A robot and a working method by the robot according to this embodiment are utilized at, for example, a production plant which assembles electric and/or electronic components etc. to produce a product, a food factory which produces box lunches (bento), etc. Moreover, although in this embodiment a case where a horizontal articulated type dual-arm robot is used as one example of the robot will be described, an articulated robot having a plurality of robotic arms may be used, regardless of the horizontal articulated type or the vertical articulated type.

[One Example of Robot Structure]

Figure 2:
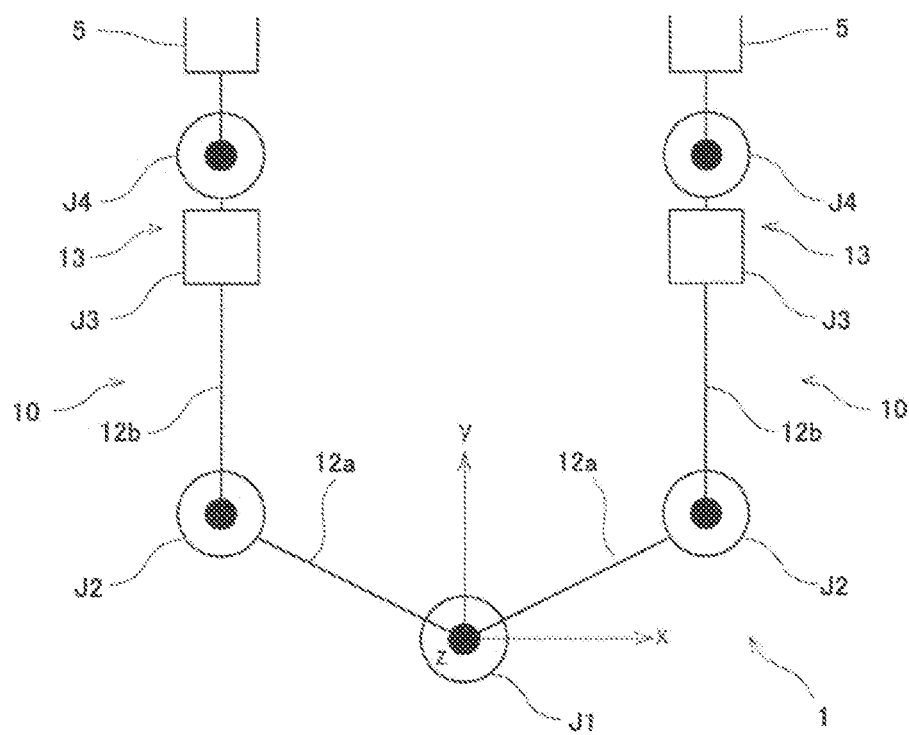
FIG. 2 is a schematic plan view of the robot.

FIG. 1 is a front view illustrating an entire structure of one example of the robot according to this embodiment, and FIG. 2 is a schematic plan view thereof. As illustrated in FIGS. 1 and 2, a robot 1 includes a carrier 17, a pair of robotic arms (hereinafter, simply referred to as "the arm(s)") 10 supported by the carrier 17, and a control device 6 accommodated in the carrier 17.

This robot 1 is a dual-arm robot having the left and right arms 10. The left and right arms 10 are capable of operating independently and operating in a mutually-related manner.

Each arm 10 is a horizontal articulated type robotic arm, and includes an arm part 11, a wrist part 13, and a hand part 15. In this example, the arm part 11 is comprised of a first link 12a and a second link 12b. Moreover, the hand part 15 is comprised of a tool 5, and the wrist part 13 has a mechanical interface to which the tool 5 is attached. Note that the left and right arms 10 have substantially the same structure except for the hand parts 15, and the tools 5 of the left and right hand parts 15 may have the same structure or different structures.

The first link 12a of the arm part 11 is coupled by the revolute joint to a base shaft 16 fixed to an upper surface of the carrier 17. The first link 12a is rotatable on a vertical rotational axis L1 which passes through the axial center of the base shaft 16. Moreover, the second link 12b is coupled to a tip end of the first link 12a by a revolute joint. The second link 12b is rotatable on a vertical rotational axis L2 defined at the tip end of the first link 12a.

The wrist part 13 is coupled to a tip end of the second link 12b by a prismatic joint, and is movable upwardly and downwardly with respect to the second link 12b.

The tool 5 of the hand part 15 is coupled to the wrist part 13 by a revolute joint, and is rotatable on a vertical rotational axis.

Each arm 10 of the structure described above has joint axes J1-J4 corresponding to the respective joints. The arm 10 is provided with driving servo motors (not illustrated) and encoders (not illustrated) which detect the rotational angles of the servo motors, so as to be associated with the joint axes J1-J4, respectively.

The rotational axes L1 of the first links 12a of the two arms 10 of the structure described above are on the same straight line, and the first link 12a of one arm 10 and the first link 12a of the other arm 10 are disposed with a vertical height difference. The origin of a basic coordinate system of the robot 1 is defined on the rotational axis L1 of the first link 12a.

Figure 3:
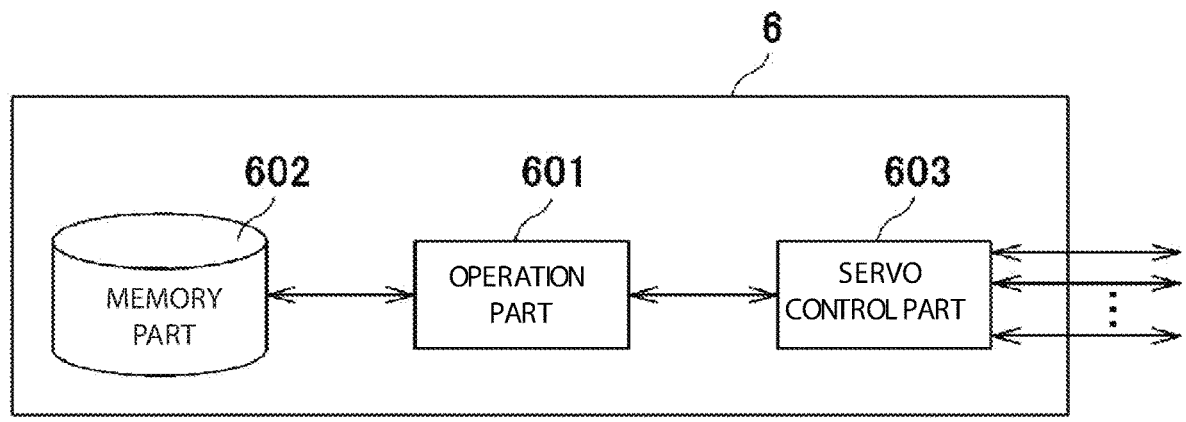
FIG. 3 is a block diagram illustrating an outline configuration of a control device of the robot.

Next, the control device 6 is described. FIG. 3 is a block diagram illustrating an outline configuration of the control device 6. As illustrated in FIG. 3, the control device 6 includes an arithmetic part 601, such as a CPU, a memory part 602, such as a ROM and/or a RAM, and a servo control part 603. The control device 6 is, for example, a robot controller provided with a computer, such as a microcontroller. Note that the control device 6 may be comprised of a sole control device which carries out a centralized control, or may be comprised of a plurality of control devices which carry out a distributed control by their mutual collaboration.

The memory part 602 stores information on a basic program as a robot controller, various fixed data, etc.

The arithmetic part 601 controls various operations of the robot 1 by reading and executing software, such as the basic program, stored in the memory part 602. That is, the arithmetic part 601 generates a control instruction of the robot 1, and outputs this to the servo control part 603. The servo control part 603 is configured to control the drive of the servo motors corresponding to the joint axes J1-J4 of each arm 10 of the robot 1 based on the control instruction generated by the arithmetic part 601.

Moreover, if the tool 5 of the hand part 15 is configured to perform an operation, such as chucking, adsorbing, etc., the control of that operation is also performed by the control device 6. Further, if the tool 5 chucks another tool and the another tool performs the operation, such as chucking, adsorbing, etc., the control of that operation of the another tool is also performed by the control device 6. Therefore, the control device 6 controls the entire operation of the robot 1.

Note that, if the tool 5 chucks another tool, the hand part 15 is comprised of the tool 5 and another tool. Moreover, the tool 5 is replaceable.

[Working Method by Robot]

Figure 4:
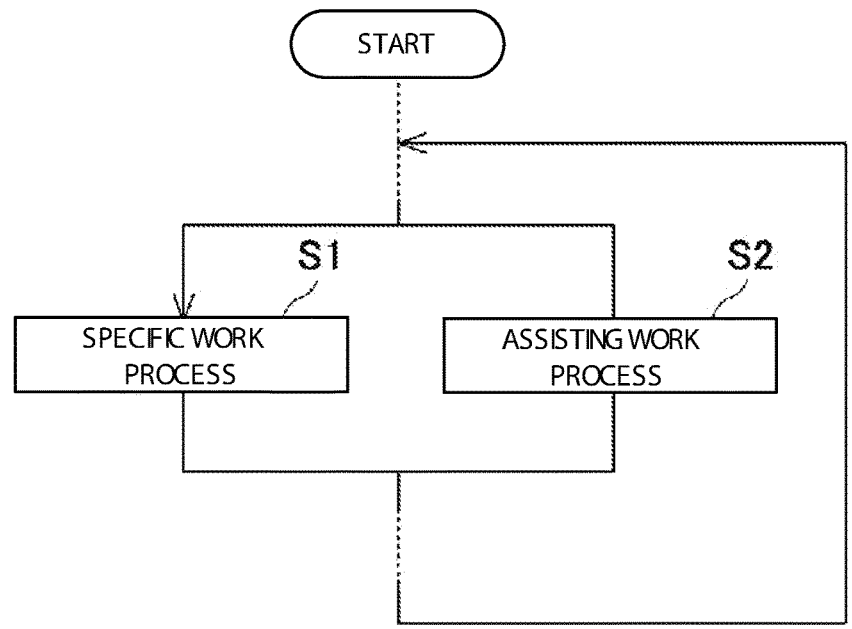
FIG. 4 is a flowchart illustrating one example of a working method by the robot.

Next, a working method by the robot 1 of the above structure is described. FIG. 4 is a flowchart illustrating one example of this working method. FIG. 4 illustrates only substantial processes of this embodiment.

Here, one of the two robotic arms 10 is referred to as a first robotic arm 10A and the other as a second robotic arm 10B.

As illustrated in FIG. 4, the robot 1 performs the specific work to the object by an operation of the first robotic arm 10A (Step S1), and performs an assisting work by an operation of the second robotic arm 10B (Step S2).

Here, a start time and an end time are not necessarily the same between the specific work and the assisting work. For example, the assisting work may be started before the start of the specific work, and the specific work and the assisting work often overlap with each other. The specific work is a given target work performed to the object. Moreover, the assisting work is, for example, a work to regulate a movement of the object in a given direction so as to contribute to the execution of the specific work and, thus, it differs from the specific work. Examples of the specific work and the assisting work will be illustrated as the following examples.

DESCRIPTION OF EXAMPLES

FIGS. 5 to 9 are views illustrating examples of the work by the robot 1.

The hand part 15 (15A) of the first robotic arm 10A which performs the specific work (hereinafter, may be referred to as "the first arm 10A") has a tool according to the specific work to be performed to the object. Moreover, the hand part 15 (15B) of the second robotic arm 10B which performs the assisting work (hereinafter, may be referred to as "the second arm 10B") has a tool according to the assisting work. Note that the wrist part 13 illustrated in FIGS. 5 to 9 is a part of the wrist part 13 provided with an exterior structure.

Moreover, since the first and second arms 10A and 10B include the hand parts 15A and 15B, respectively, as described above, operations by the tools of the hand parts 15A and 15B may also be described as operations by the first and second arms 10A and 10B.

First Example

Figure 5:
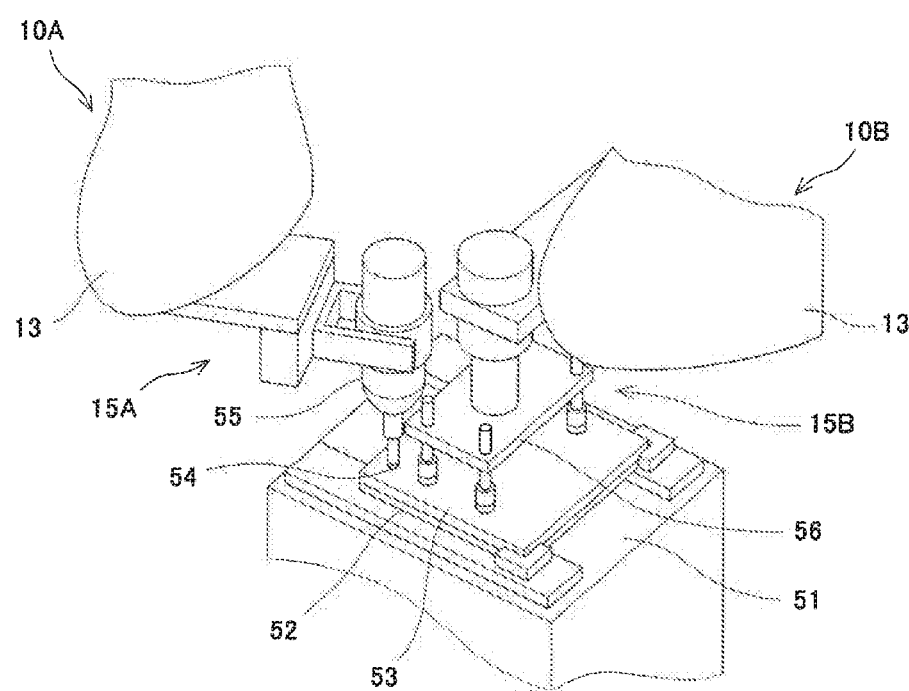
FIG. 5 is a view illustrating a first example of a work by the robot.

FIG. 5 illustrates a case where a work (specific work) to fix a substrate 53 to be used for an electric device onto a frame 52 with screws 54 is performed. In this case, the hand part 15A of the first arm 10A has a screw-fastening machine 55. Moreover, the hand part 15B of the second arm 10B has an adsorption device 56 which adsorbs the substrate 53. In this case, the object is the frame 52 and the substrate 53, and is one example of a plurality of members (here, plate-like members).

Although the details are omitted here, the frame 52 is placed on a workbench 51 by the robot 1, and the substrate 53 is placed thereon. Then, as illustrated in FIG. 5, the second arm 10B adsorbs the substrate 53 by the adsorption device 56, and maintains a state where it pushes the substrate 53 downwardly. Thus, an upward movement of the frame 52 and the substrate 53 is regulated, and the frame 52 and the substrate 53 are temporarily fixed onto the workbench 51 (assisting work). In this state, the first arm 10A tightens the screws 54 by the screw-fastening machine 55 at given locations. Thus, the substrate 53 is fixed onto the frame 52 with the screws 54. Note that the screws 54 are attached to the parts corresponding to four corners of the substrate 53. In FIG. 5, after attaching the screws 54 to the parts corresponding to two corners on the left side of the substrate 53 (first arm 10A side), the hand part 15B of the second arm 10B releases the substrate 53, and evacuates to a given position. Then, the screws 54 are attached to the parts corresponding to two corners on the right side of the substrate 53.

Second Example

Figure 6:
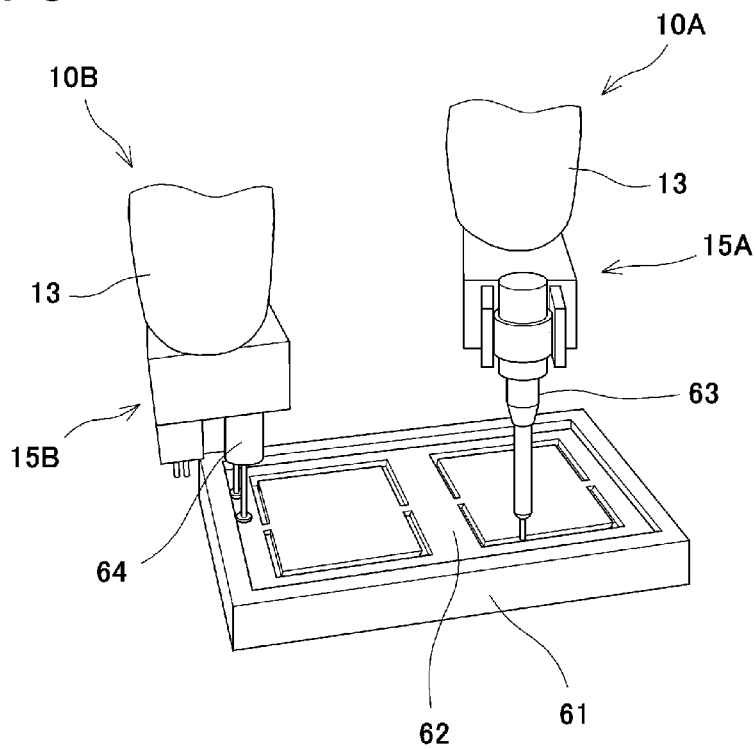
FIG. 6 is a view illustrating a second example of the work by the robot.

FIG. 6 illustrates a case where a work (specific work) which cuts a resin substrate 62 at a given location is performed. In this case, the hand part 15A of the first arm 10A has a leutor 63 for substrate cutting. Moreover, the hand part 15B of the second arm 10B has an adsorption device 64 which adsorbs the resin substrate 62. In this case, the object is the resin substrate 62 comprised of a plate-like member.

As illustrated in FIG. 6, after the resin substrate 62 is placed on the workbench 61, the second arm 10B adsorbs the resin substrate 62 by its adsorption device 64, and maintains a state where it pushes the resin substrate 62 downwardly. Thus, an upward movement of the resin substrate 62 is regulated, and the resin substrate 62 is temporarily fixed onto the workbench 61 (assisting work). In this state, the first arm 10A cuts the resin substrate 62 at the given location by the leutor 63 for substrate cutting. Thus, two resin substrates of a desired shape (here, tetragon) and size are obtained.

Third Example

Figure 7:
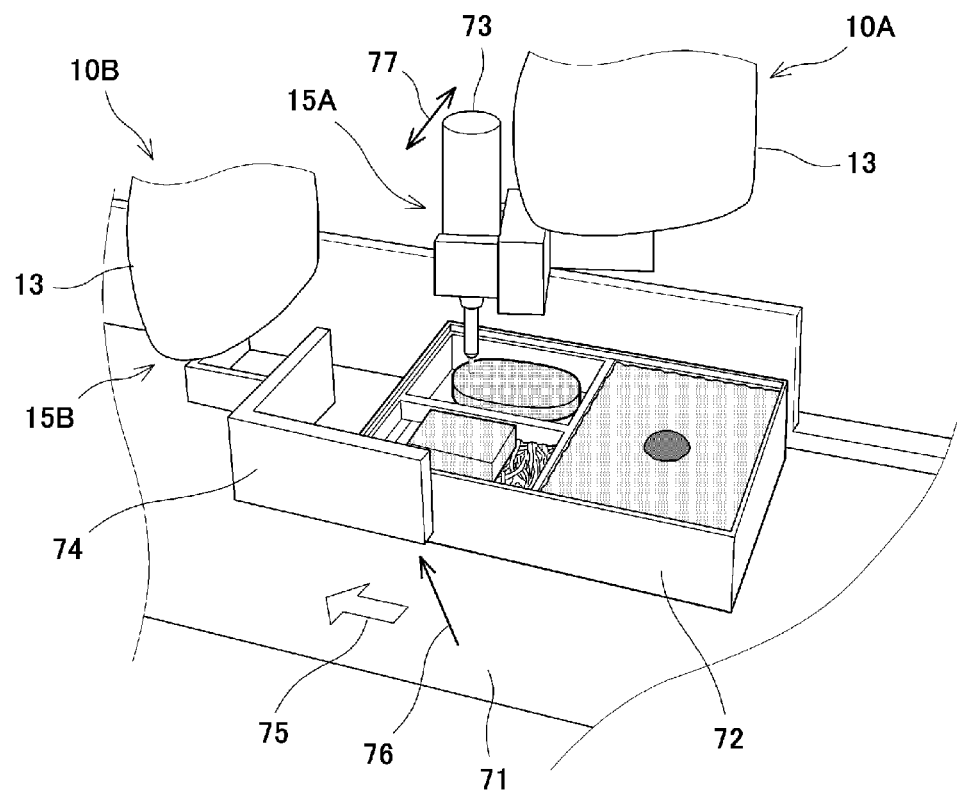
FIG. 7 is a view illustrating a third example of the work by the robot.

FIG. 7 illustrates a case where a work (specific work) to pour sauce over a specific dish (e.g., a hamburg steak) is performed when a lunch box 72 containing a plurality of articles, such as cooked rice and a plurality of kinds of dishes, is conveyed in a direction of an arrow 75 by a conveyor 71. In this case, the hand part 15A of the first arm 10A has a sauce discharging device 73. Moreover, the hand part 15B of the second arm 10B has a guide member 74 of an L-shape for guiding the lunch box 72. In this case, the object is the lunch box 72 containing the cooked rice and the plurality of kinds of dishes, and sauce (given thing) is stored in this lunch box 72.

The lunch box 72 being conveyed by the conveyor 71 is not in a specific posture, in an exemplary embodiment. Therefore, the lunch box 72 conveyed is detected by a detector (not illustrated), such as a photoelectric sensor. This detection signal is inputted into the control device 6 of the robot 1.

By the second arm 10B moving the guide member 74 in a direction of an arrow 76, the lunch box 72 is guided toward one end of the conveyor 71 in width directions along the guide member 74 to be made in a specific posture as illustrated in FIG. 7 (assisting work). In the conveying state in this posture, the first arm 10A causes the sauce discharging device 73 to discharge the sauce, while the hand part 15A operates so that a reciprocating movement in an arrow 77 direction (the width direction of the conveyor 71) is repeated. Thus, the sauce can be poured over the dish (e.g., hamburg steak) at the specific location of the lunch box 72.

Note that, in the example described above, although the sauce is poured while conveying the lunch box 72, the conveyor 71 may be stopped after the lunch box 72 becomes in the specific posture, and the sauce may then be poured over the lunch box 72 in a stationary state.

Fourth Example

Figure 8:
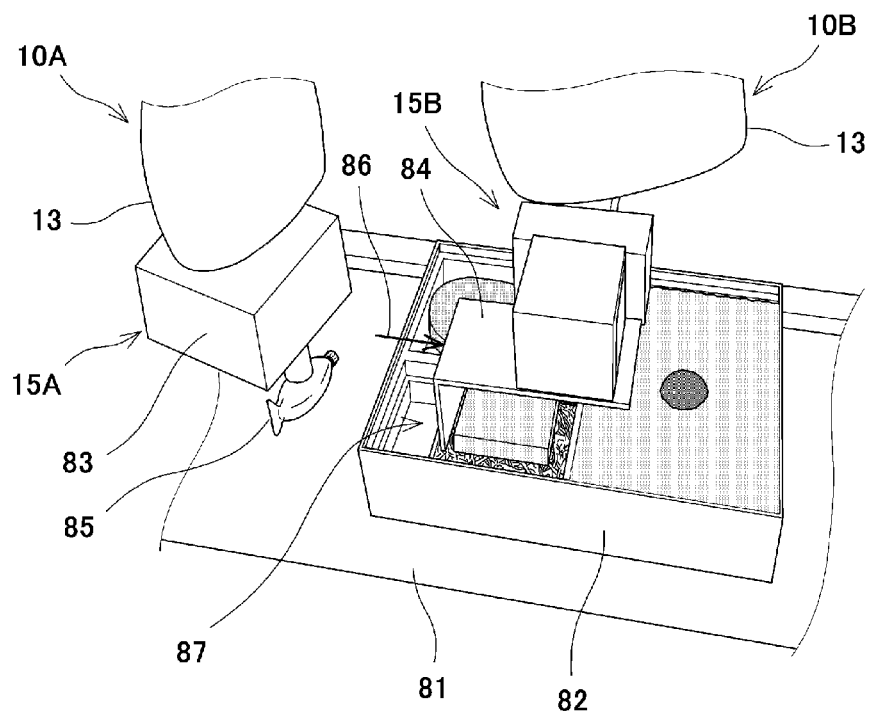
FIG. 8 is a view illustrating a fourth example of the work by the robot.

FIG. 8 illustrates a case where a work (specific work) to store, for example, a container 85 containing soy sauce (given thing) at a given position in a lunch box 82 (object) containing a plurality of articles, such as cooked rice and a plurality of kinds of dishes is performed. In this case, the hand part 15A of the first arm 10A has an adsorption device 83. Moreover, the hand part 15B of the second arm 10B has an L-shaped put-aside member 84 which gathers the dish(es) in the lunch box 82 in a given direction in a horizontal plane (a direction of an arrow 86).

In this case, the lunch box 82 conveyed in a specific posture by the conveyor 81 is detected by a detector (not illustrated), such as the photoelectric sensor, and the conveyor 81 is then stopped so that the lunch box 82 stops at a given position on the conveyor 81. Moreover, a detection signal of the detector is inputted into the control device 6 of the robot 1.

Then, as illustrated in FIG. 8, the second arm 10B moves the put-aside member 84 in the direction of the arrow 86 with respect to the lunch box 82 which is stopped on the conveyor 81. Thus, the dish contained in the lunch box 82 is put aside in the direction of the arrow 86 to form a given space 87 in the lunch box 82 (assisting work). In this state, the first arm 10A operates so that the container 85 containing soy sauce which is adsorbed by the adsorption device 83 moves right above the space 87, and drops the container 85 containing soy sauce by stopping the adsorbing operation of the adsorption device 83. Thus, the container 85 containing soy sauce can be stored in the given space 87 in the lunch box 82.

Note that other dishes etc. may be stored in the lunch box 82, instead of the container 85 containing soy sauce.

Fifth Example

Figure 9:
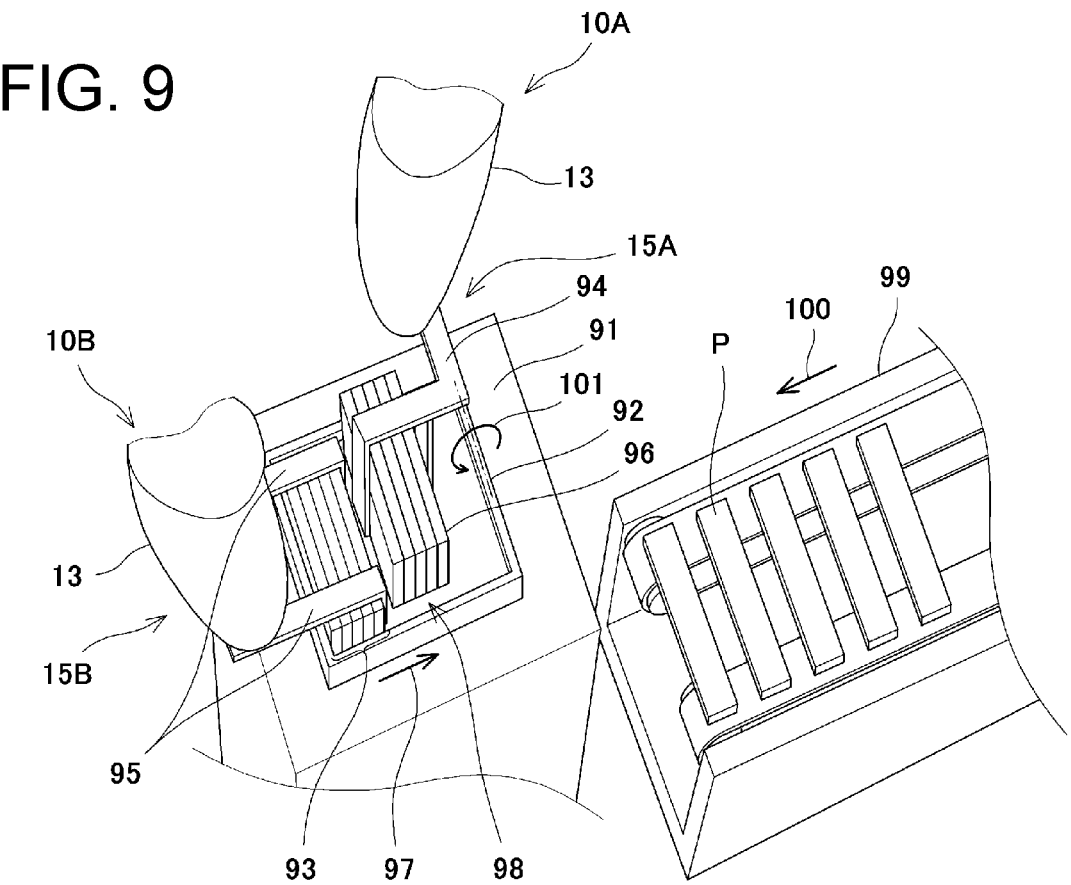
FIG. 9 is a view illustrating a fifth example of the work by the robot.

FIG. 9 illustrates a case where a work to store a plate-like confectionery P wrapped with a bag in a confectionery box 92 placed on the workbench 91 is performed. Here, a case is illustrated where a work (specific work) to store a plurality of confectioneries 96 (given thing) at a given position in the confectionery box 92 (object) containing a plurality of confectioneries 93 is performed. In this case, the hand part 15A of the first arm 10A has a grip device 94 which grips the plurality of confectioneries 96. Moreover, the hand part 15B of the second arm 10B has L-shaped regulating members 95 for preventing that the confectioneries 93 put into the confectionery box 92 fall in a given direction (a direction of an arrow 97) and spread laterally due to a packing bag being swelled. The grip device 94 attached to the hand part 15A of the first arm 10A is configured so that it is rotatable in positive and reverse directions by 90 degrees in an arrow 101 direction and the direction opposite to, respectively, and is capable of gripping the plurality of confectioneries.

The confectionery P to be stored in the confectionery box 92 is conveyed in an arrow 100 direction by a conveyor 99. At a taking-out end of the conveyor 99, the grip device 94 becomes into a state where it is rotated in the arrow 101 direction by 90 degrees from a state of FIG. 9, and then grips the given number of confectioneries P (in this example, five pieces) when it received the confectioneries P. Then, the grip device 94 is rotated reversely by 90 degrees and moved to the confectionery box 92, and canceling the gripping of the confectioneries to put the confectioneries into the confectionery box 92.

As described above, when the plurality of confectioneries 93 are first put into the confectionery box 92 by the first arm 10A, the regulating members 95 of the second arm 10B are moved to be a state illustrated in FIG. 9 at a timing of putting the confectioneries 93 gripped by the grip device 94 into the confectionery box 92. In this state, the first arm 10A cancels the gripping of the grip device 94, and then receives a plurality of confectioneries 96 to be put into confectionery box 92 next at the taking-out end of the conveyor 99 and puts then into the confectionery box 92. This state where the confectioneries 96 are about to be put into the confectionery box 92 is illustrated in FIG. 9.

Then, as illustrated in FIG. 9, the regulating members 95 of the second arm 10B prevent that the confectioneries 93 previously put into the confectionery box 92 fall or their packing bags swell to spread laterally, and a given space 98 into which the next confectioneries are put is secured into the confectionery box 92 (assisting work). In this state, the first arm 10A puts the confectioneries 96 into the space 98 in the state where it grips the confectioneries 96 by the grip device 94. Thus, the confectioneries 96 can be stored in the given space 98 in the confectionery box 92.

Other Examples

Although examples of the work other than the above will be illustrated below, the work is not limited to these examples. Note that, similar to the examples described above, the first arm 10A and the second arm 10B are attached with the hand part 15A and the hand part 15B according to the respective works in any case.

(1) When performing a work to store a given number of wrapped confectioneries into a confectionery box, the confectionery box is fixed by the second arm 10B. Then, by the first arm 10A, the adsorption grip is carried out and the given number of confectioneries are put into the confectionery box.

(2) When performing the work which is to connect an FPC (Flexible Printed Circuit board) to a FPC connector mounted on a substrate, the substrate is fixed while a distortion of the substrate is corrected by the second arm 10B pressing down the substrate against a workbench. Then, the FPC is adsorbed and gripped by the first arm 10A and is inserted into the FPC connector.

(3) In order to strengthen the fixation of components to be mounted on a substrate etc., when performing a work to apply a fixing agent (thermoset resin, ultraviolet curing resin, etc.) to the substrate, the second arm 10B fixes the substrate by pressing down the substrate on the workbench (or may be pressed down while adsorbing). Then, the fixing agent is applied by the first arm 10A.

(4) When performing a work to cut off runner(s) of a resin molded product, the second arm 10B grips the resin molded product with the runner(s) which is taken out from a molding machine. Then, a cutting nipper is attached to the hand part 15A of the first arm 10A, and the runner(s) is cut off by this cutting nipper.

(5) In order to take out recyclable resources (e.g., rare metals etc.) from an electric device, such as a mobile phone, when performing a work to disassemble the electric device and take out component(s), the second arm 10B presses down the electric device on the workbench to fix it temporarily. Then, a screw-fastening machine is attached to the hand part 15A of the first arm 10A, and after loosening and removing screws with which the component(s) is fixed by the screw-fastening machine, the component(s) is adsorbed and gripped, and removed.

(6) When performing a work to stick a label on a workpiece, the second arm 10B presses down the workpiece on a workbench to fix it temporarily. Then, the first arm 10A grips the label, and sticks the label on the fixed workpiece.

(7) When performing a work to create a hot dog, the second arm 10B grips a bread roll so that a break of the bread roll where a cut is made is spread. Then, the first arm 10A grips a sausage, and inserts it into the break of the bread roll.

(8) When performing a work to attach a cap to a bottle containing liquid, such as liquid medical supplies, the second arm 10B grips the bottle containing the liquid to which the cap is not attached. Then, the first arm 10A grips the cap, and fastens it along to the thread of a bottle mouth.

(9) When performing a work to open a canned food, the second arm 10B presses down the canned food on the workbench to fix it temporarily. Then, for example, an electric can opener machine is attached to the hand part 15A of the first arm 10A, and the canned food is opened by this can opener machine.

(10) When performing a work to fold clothing, the second arm 10B presses down an end of the clothing on the workbench to fixit temporarily. Then, the first arm 10A grips the other end of the clothing and folds the clothing.

(11) When performing a work to insert documents, such as a product catalog, into a clear file folder, the second arm 10B adsorbs one side surface of the clear file folder and maintains the adsorption to form an opening, and the first arm 10A then adsorbs the documents and inserts them into the clear file folder from the opening.

Additionally, when performing a work to supply a workpiece to a processing machine, such as a caulking machine or a pressing machine, the robot 1 grips the workpiece by the first arm 10A or the second arm 10B, transfers the workpiece to a given position of the processing machine, and holds the workpiece, and the processing machine then processes the workpiece in the holding state. In this case, the robot 1 is capable of performing the transferring, positioning, and fixation of the workpiece.

As described above, the robot 1 includes the first robotic arm 10A having at the tip end thereof the hand part 15A according to the specific work to be performed to the object, and the second robotic arm 10B having at the tip end thereof the hand part 15B according to the assisting work to assist the specific work. The first robotic arm 10A is configured to perform the specific work to the object, and the second robotic arm 10B is configured to perform the assisting work in which the movement of the object in the given direction is regulated, when the first robotic arm 10A performs the specific work.

With this structure, when the first robotic arm performs the specific work, by the second robotic arm 10B performing the assisting work in which the movement of the object in the given direction is regulated, the specific work can favorably be carried out, without requiring the jig for fixing the object, the device for adjusting the posture of the object, etc.

In addition, the second robotic arm 10B may be configured so that it performs the assisting work in which the upward movement of the object is regulated by pressing down the object placed on the given workbench and the object is temporarily fixed onto the workbench (see the examples illustrated in FIGS. 5 and 6).

In this case, the object may be comprised of a plurality of laminated members (e.g., plate-like members), and the first robotic arm 10A may be configured to perform the specific work to mutually fix the plurality of members with screws by fastening screws to the object (see the example illustrated in FIG. 5). Alternatively, the first robotic arm 10A may be configured to perform the specific work to cut the given part of the object by cutting the object (see the example illustrated in FIG. 6).

Moreover, the second robotic arm 10B may be configured to perform, by performing the operation to guide the object being conveyed on the conveyor in the given direction of the width directions of the conveyor, the assisting work to regulate the movement of the object in the direction opposite to the given direction and making the object into the given posture with respect to the conveying direction, while the first robotic arm 10A may be configured to perform the specific work to store the given thing in the object on the conveyor by supplying the given thing to the object which became in the given posture (see the example illustrated in FIG. 7).

Moreover, the object is comprised of a box of which the upper surface is opened and in which one or more articles are accommodated, the second robotic arm 10B may be configured to perform, by performing the operation to put the article in the box aside in the given direction in the horizontal plane, the assisting work to regulate the movement of the article in the direction opposite to the given direction and securing the given space in the box, while the first robotic arm 10A may be configured to perform the specific work to store the given thing in the space in the box by supplying the given thing to the given position (see the example illustrated in FIG. 8).

Moreover, the object is comprised of the box of which the upper surface is opened and in which one or more articles are accommodated, and the second robotic arm 10B may be configured to perform, by contacting the regulating member for preventing that the article in the box spread in the given direction in the horizontal plane with the side surface of the article, the assisting work to regulate the movement of article in the direction opposite to the given direction and securing the given space in the box, while the first robotic arm 10A may be configured to perform the specific work to store the given thing in the space in the box by supplying the given thing to the given position (see the example illustrated in FIG. 9).

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. Details of the structures and/or the functions may substantially be changed, without departing from the spirit of the present disclosure.

INDUSTRIAL APPLICABILITY

The present disclosure is useful as the robot and the working method by the robot, which are capable of favorably carrying out the specific work without requiring the jig for fixing the object, such as the workpiece etc., the device for adjusting the posture of the object, etc.

DESCRIPTION OF REFERENCE CHARACTERS

1 Robot
10 Robotic Arm
10A First Robotic Arm
10B Second Robotic Arm
15, 15A, 15B Hand Part

What is claimed is:

1. A robot, comprising:
   a first robotic arm having at a tip end a hand part according to a specific work to be performed to a box of which an upper surface is opened and in which one or more non-self-standing plate-shaped articles are accommodated; and
   a second robotic arm having at a tip end a hand part according to an assisting work to assist the specific work, and being configured to respectively contact two L-shaped regulating members with an upper surface and a side surface of the non-self-standing plate-shaped article,
   wherein the second robotic arm is configured to perform, by respectively contacting the two L-shaped regulating members, for preventing that the non-self-standing plate-shaped article in the box spread in a given direction in a horizontal plane, with the upper surface and the side surface of the non-self-standing plate-shaped article, the assisting work to regulate a movement of the non-self-standing plate-shaped article in the given direction in the horizontal plane and secure a given space in the box, and
   wherein the first robotic arm is configured to perform the specific work of:
      (i) gripping the non-self-standing plate-shaped article, conveyed by a conveyor, with a grip device attached to the first robotic arm;
      (ii) positioning the grip device between the two regulating members when viewed from the side surface of the non-self-standing plate-shaped article whose movement in the given direction in the horizontal plane is being regulated by the two regulating members; and
      (iii) storing the non-self-standing plate-shaped article at a given position in the space inside the box.

2. A working method by a robot, the robot comprising a first robotic arm having at a tip end a hand part according to a specific work to be performed to a box of which an upper surface is opened and in which one or more non-self-standing plate-shaped articles are accommodated and a second robotic arm having at a tip end a hand part according to an assisting work to assist the specific work, the method comprising:
   respectively contacting, by the second robotic arm, two L-shaped regulating members with an upper surface and a side surface of the non-self-standing plate-shaped article;
   performing, by the second robotic arm, the assisting work to regulate a movement of the non-self-standing plate-shaped article in a given direction in a horizontal plane and secure a given space in the box by respectively contacting the two L-shaped regulating members, for preventing that the non-self-standing plate-shaped article in the box spread in the given direction in the horizontal plane, with the upper surface and the side surface of the non-self-standing plate-shaped article; and
   performing, by the first robotic arm, the specific work of:
      (i) gripping the non-self-standing plate-shaped article, conveyed by a conveyor, with a grip device attached to the first robotic arm;
      (ii) positioning the grip device between the two regulating members when viewed from the side surface of the non-self-standing plate-shaped article whose movement in the given direction in the horizontal plane is being regulated by the two regulating members; and (iii) storing the non-self-standing plate-shaped article at a given position in the space inside the box.

* * * * *